UNITED STATES PATENT OFFICE.

JOHN CARNRICK, OF NEW YORK, N. Y.

DIETETIC COMPOUND.

SPECIFICATION forming part of Letters Patent No. 342,574, dated May 25, 1886.

Application filed October 16, 1885. Serial No. 125,205. (No specimens.)

*To all whom it may concern:*

Be it known that I, JOHN CARNRICK, of the city, county, and State of New York, have invented a certain new and useful Dietetic Compound or Composition of Matter, of which the following is such a clear, full, and exact description as will enable others skilled in the art to which my invention appertains to make and compound the same.

This invention comprises a novel compound or composition of matter composed of the following elements, to wit: meat, gluten or wheat, and milk, these forming in combination a nutritious and valuable food product of a concentrated character, and especially adapted for use by persons of weak digestion or those in impaired health. When desired, the meat may be substituted in whole or in part by "meat extract," so termed, as the equivalent of the meat itself. In like manner the milk may be substituted in whole or in part by cream, as an equivalent thereof, or the milk may contain its normal proportion of cream, or may be used when wholly or in part deprived of its cream.

In making my improved compound, I take meat, preferably lean beef or mutton, and reduce the same by any suitable means to a finely-divided state, after which the same is boiled or cooked, and either under pressure in a rendering-pan or by any other suitable means. Gluten or wheat is also boiled or cooked under pressure or otherwise, either together with the meat or separately, and afterward added thereto. Milk, with or without the cream, or cream alone, is also added, and the whole mass thus incorporated together is then either partially evaporated or wholly reduced to a powdered state.

I do not intend to confine myself to any particular process of manipulating the ingredients or materials, but any method may be employed which will produce their incorporation. Each ingredient may be separately prepared and reduced to a powdered form, after which the whole may be incorporated together, so as to form the compound. I prefer to use equal proportions of the ingredients in the formation of the compound. Pepsic agents may be added to one or more of the ingredients, if desired, in any stage of the process; but I claim the combination of pepsic or digestive agents with gluten or wheat, meat, and milk, and their respective equivalents, in application Serial No. 140,380, filed August 12, 1884, for Letters Patent, separate and distinct to those to be granted in pursuance of this present application. I prefer to reduce the liquid compound to a powdered form by drying *in vacuo* or otherwise, thus rendering it more easy of transport and convenient in use. This drying may, however, of course, be omitted.

When the compound is made, it may be put up ready for sale in bottles, jars, or other vessels, which should be securely corked or closed, and if in the powdered form it may also be put up in boxes or packages, and so placed upon the market.

When desired, this compound may be flavored with any proper substance, and the same may be used at the same time or in conjunction with any appropriate medicine or any desired nutritive food.

I am aware that it has been proposed to use powdered extract of meat, gluten, and milk together with vegetables and spices, for making a sauce; but I make no claim to such a mixture.

What I claim as my invention is—

The new composition of matter composed of meat, gluten or wheat, and milk, substantially as herein set forth.

JOHN CARNRICK.

Witnesses:
WM. H. SLOAN,
EDWD. F. WILLIAMS.